(12) United States Patent
Zheng et al.

(10) Patent No.: US 11,963,027 B2
(45) Date of Patent: Apr. 16, 2024

(54) MEASUREMENT METHOD, TERMINAL AND NETWORK SIDE DEVICE

(71) Applicant: VIVO MOBILE COMMUNICATION CO., LTD., Chang'an Dongguan (CN)

(72) Inventors: Qian Zheng, Chang'an Dongguan (CN); Xiaodong Yang, Chang'an Dongguan (CN); Wei Bao, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 547 days.

(21) Appl. No.: 17/159,812

(22) Filed: Jan. 27, 2021

(65) Prior Publication Data

US 2021/0153058 A1 May 20, 2021

Related U.S. Application Data

(63) Continuation of application No. PCT/CN2019/096689, filed on Jul. 19, 2019.

(30) Foreign Application Priority Data

Jul. 27, 2018 (CN) .......................... 201810844807.1

(51) Int. Cl.
*H04W 24/10* (2009.01)
*H04W 24/02* (2009.01)
(52) U.S. Cl.
CPC ........... *H04W 24/10* (2013.01); *H04W 24/02* (2013.01)

(58) Field of Classification Search
CPC ..... H04W 24/10; H04W 24/02; H04W 76/27; H04W 76/30; H04W 72/23; H04L 5/0053; H04L 5/001
See application file for complete search history.

(56) References Cited

U.S. PATENT DOCUMENTS

2013/0208617 A1    8/2013   Fukuta
2017/0359747 A1   12/2017   Lunden et al.
(Continued)

FOREIGN PATENT DOCUMENTS

CN    101547467 A    9/2009
CN    102938905 A    2/2013
(Continued)

OTHER PUBLICATIONS

Search Report for related International Application No. PCT/CN2019/096689; report dated Feb. 11, 2021.
(Continued)

*Primary Examiner* — Vinncelas Louis
(74) *Attorney, Agent, or Firm* — von Briesen & Roper, s.c.

(57) ABSTRACT

A measurement method, a terminal and a network side device are provided. The measurement method performed by a terminal includes: in a non-connected state, triggering an automatic measurement when a predetermined condition is met. In an embodiment of present disclosure, it is agreed that the terminal in a non-connected state triggers the automatic measurement when the predetermined condition has been met, so the terminal immediately reports an indication indicating that there is an available measurement result, or report an available measurement result, to the network side device when entering a connected state.

20 Claims, 5 Drawing Sheets

(56) References Cited

U.S. PATENT DOCUMENTS

| | | | |
|---|---|---|---|
| 2018/0110082 A1 | 4/2018 | Mikko et al. | |
| 2019/0037425 A1* | 1/2019 | Hong | H04W 72/23 |
| 2019/0380052 A1* | 12/2019 | Yang | H04L 5/001 |
| 2020/0196170 A1 | 6/2020 | Jiang et al. | |
| 2021/0051536 A1* | 2/2021 | Yang | H04W 76/30 |

FOREIGN PATENT DOCUMENTS

| | | | |
|---|---|---|---|
| CN | 103155620 A | 6/2013 | |
| CN | 107959983 A | 4/2018 | |
| CN | 108235336 A | 6/2018 | |
| CN | 108260139 A | 7/2018 | |

OTHER PUBLICATIONS

First Office Action for related Chinese Application No. 201810844807.1; report dated May 26, 2020.

Second Office Action for related Chinese Application No. 201810844807.1; report dated Feb. 1, 2021.

Huawei V, Idle Mode Measurement Reporting message, 3GPP TSG-RAN WG2 Meeting #101 R2-1802669, Feb. 3, 2018(Feb. 3, 2018).

Nokia, Nokia Shanghai Bell, Running CR on UE requirements for euCA, 3GPP TSG-RAN WG4 Meeting #86bis, R4-1805263, Apr. 20, 2018(Apr. 20, 2018).

Ericsson, CA establishment from Idle and Suspended, 3GPP TSG-RAN WG2 #99bis, Tdoc R2-1711534, Oct. 13, 2017(Oct. 13, 2017).

TSG RAN WG2, LS on further RAN2 agreements for euCA, 3GPP TSG-RAN WG2 #101bis, R2-1806244, Apr. 20, 2018 (Apr. 20, 2018).

Noki, Nokia Shanghai Bell, Finalizing IDLE mode measurements for euCA, 3GPP TSG-RAN WG2 Meeting #102, R2-1806772, May 25, 2018(May 25, 2018).

Extended European Search Report related to Application No. 19840432.9 dated Sep. 24, 2021.

Huawei, et al.; "Discussion on continuing idle mode measurement"; 3GPP TSG-RAN WG2 Meeting #102, Busan Korea, May 21-25, 2018; R2-1808345.

Qualcomm Incorporated ; "Fast SCell Configuration and Activation Through network assisted RRC_Idle mode measurements"; 3GPP TSG-RAN2 Meeting #99, Prague, Czech Republic, Oct. 9-13, 2017; R2-1710152.

* cited by examiner

Fig.1

In a non-connected state, triggering an automatic measurement when a predetermined condition is met — 21

MEASUREMENT METHOD, TERMINAL AND NETWORK SIDE DEVICE

CROSS-REFERENCE TO RELATED APPLICATION

This application is continuation application of PCT International Application No. PCT/CN2019/096689 filed on Jul. 19, 2019, which claims a priority of the Chinese patent application No. 201810844807.1 filed in China on Jul. 27, 2018, the disclosures of which are incorporated herein by reference in their entireties.

TECHNICAL FIELD

The present disclosure relates to the field of wireless communications technologies, in particular to a measurement method, a terminal and a network side device.

BACKGROUND

In the related art, a long term evolution (Long Term Evolution, LTE) enhancing carrier aggregation utilization (Enhancing CA Utilization, EuCA) project plans to enhance a carrier aggregation technology, and a rapid activation and deactivation function of a carrier is introduced. To be specific, a method includes the following steps.

A network side device sends measurement configuration information for an idle (IDLE) state to a user equipment (UE) via a system broadcast message system information block type 5 (System Information Block Type 5, SIB5) and/or a radio resource control (Radio Resource Control, RRC) connection release (RRC Connection Release) message.

Next, the network side device indicates, via a system broadcast message SIB2, that a network side wants to receive a measurement result of the UE in an IDLE state.

When the UE determines that there is the measurement result in the IDLE state and the system broadcast message system information block type 2 (System Information Block Type 2, SIB2) indicates that the network side wants to receive the measurement result of the UE in the IDLE state, the UE reports to a network that the measurement result in the IDLE state is available.

The network side device rapidly configures and activates a carrier aggregation (Carrier Aggregation, CA) carrier for the UE in accordance with the measurement result in the IDLE state reported by the UE.

In an LTE system, the UE in the IDLE state starts a measurement validity timer and performs the measurement only when the measurement configuration information of the RRC connection release message including a measurement valid time has been received from the network side device, so it is adverse to an acceleration of an activation process of the CA carrier for the terminal.

SUMMARY

An embodiment of the present disclosure provides a measurement method, a terminal and a network side device.

The present disclosure is to be implemented as follows.

In a first aspect, an embodiment of the present disclosure provides a measurement method, and the method is performed by a terminal and includes: in a non-connected state, triggering an automatic measurement when a predetermined condition is met.

In a second aspect, an embodiment of the present disclosure provides a measurement method, and the method is performed by a network side device and includes: receiving an indication reported by a terminal and indicating that there is an available measurement result, or receiving an available measurement result. The measurement result is acquired through an automatic measurement performed by the terminal in a non-connected state when a predetermined condition is met.

In a third aspect, an embodiment of the present disclosure provides a terminal, and the terminal includes a measurement module, configured to trigger an automatic measurement in a non-connected state when a predetermined condition is met.

In a fourth aspect, an embodiment of the present disclosure provides a network side device, and the network side device includes a reception module, configured to receive an indication reported by a terminal and indicating that there is an available measurement result, or receive an available measurement result. The measurement result is acquired through an automatic measurement performed by the terminal in a non-connected state when a predetermined condition is met.

In a fifth aspect, an embodiment of the present disclosure provides a terminal, and the terminal includes a processor, a memory, and a computer program stored in the memory and executed by the processor. The computer program is executed by the processor, the step of the above-mentioned measurement method for the terminal is implemented.

In a sixth aspect, an embodiment of the present disclosure provides a network side device, including a processor, a memory, and a computer program stored in the memory and executed by the processor. The computer program is executed by the processor, the step of the above-mentioned measurement method for the network side device is implemented.

In a seventh aspect, an embodiment of the present disclosure provides a computer-readable storage medium storing therein a computer program. The computer program is executed by a processor, the step of the above-mentioned measurement method is implemented.

According to the embodiments of the present disclosure, it is agreed that the terminal in the non-connected state may trigger the automatic measurement when the predetermined condition has been met, so the terminal may immediately report the indication indicating that there is the available measurement result, or report the available measurement result, to the network side device when entering a connected state. As a result, it is able for the network side device to rapidly configure and activate a CA carrier for the UE in accordance with the measurement result reported by the UE in the non-connected state, thereby to improve the communication efficiency.

BRIEF DESCRIPTION OF THE DRAWINGS

Various other advantages and benefits will become apparent to those of ordinary skill in the art upon reading the detailed description of optional embodiments below. The drawings are only for the purpose of illustrating optional embodiments and are not to be considered as limiting the present disclosure. Moreover, the same reference numerals are used throughout the drawings to refer to the same components. In the figures.

DETAILED DESCRIPTION

The technical solutions of embodiments of the present disclosure will be clearly described below with reference to the drawings of embodiments of the present disclosure, apparently, the described embodiments are some embodiments of the present disclosure, but are not all the embodiments. Based on embodiments of the present disclosure, all other embodiments derived by a person of ordinary skill in the art without any creative efforts shall fall within the scope of the present disclosure.

The terms "comprise" in the specification and the claims of the present application and any variants thereof are intended to cover non-exclusive inclusions, for example, a process, a method, a system, a product, or a device that includes a series of steps or units is not necessarily limited to those steps or units clearly listed, but may include other steps or units not explicitly listed or inherent to such processes, methods, products or devices. In addition, the term "and/or" in the specification and claims indicates at least one of connected objects, for example, A and/or B may represent that, there is only A, there are both A and B, and there is only B.

In embodiments of the present disclosure, terms such as "exemplary" or "for example" are used to represent examples, illustrations, or explanations. In embodiments of the present disclosure, any embodiment or design solution described as "exemplary" or "for example" should not be construed as being more preferable or advantageous than other embodiments or design solutions. Rather, use of terms such as "illustrative" or "for example" is intended to present concepts in a concrete manner.

Embodiments of the present disclosure will be described below with reference to the drawings. A measurement method and a terminal involved in an embodiment of the present disclosure may be applied to a wireless communications system. The wireless communication system may be a 5G system, an evolved long term evolution (Evolved Long Term Evolution, eLTE) system, or a subsequently-evolved communications system.

Figure 1:
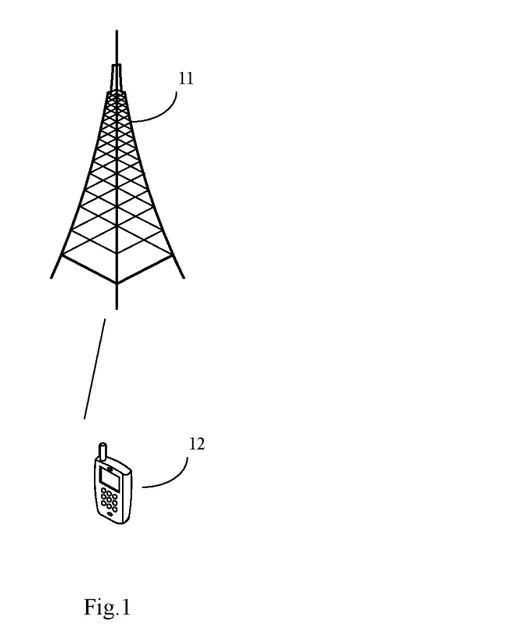
FIG. 1 is a schematic view showing architecture of a wireless communications system provided in an embodiment of the present disclosure.

Referring to FIG. 1, architecture of a wireless communications system provided in an embodiment of the present disclosure is illustrated. As shown in FIG. 1, the wireless communications system may include a network side device 11 and a terminal 12, and the terminal 12 may be connected to the network side device 11. In actual use, the devices may be connected to each other in a wireless manner. A solid line is adopted in FIG. 1, so as to conveniently and intuitively show a connection relationship between the devices.

It should be appreciated that, the communications system may include a plurality of terminals 12, and the network side device may communicate with the plurality of terminals 12 (for transmission of a signaling or data).

The network side device 11 provided in an embodiment of the present disclosure may be a base station. The base station may be a commonly-used base station, an evolved node base station (evolved node base station, eNB), a network side device in a 5G system (e.g., a next generation node base station (next generation node base station, gNB) or a transmission and reception point (transmission and reception point, TRP)), a cell, or a network side device in a subsequently-evolved communications system. The names of the base station shall not be construed as limitation.

The terminal 12 provided in an embodiment of the present disclosure may be a mobile phone, a tablet computer, a laptop computer, an ultra-mobile personal computer (Ultra-Mobile Personal Computer, UMPC), a netbook, or a personal digital assistant (Personal Digital Assistant, PDA), etc. It should be appreciated that, the names of the terminal shall not be construed as limitation.

Figure 2:
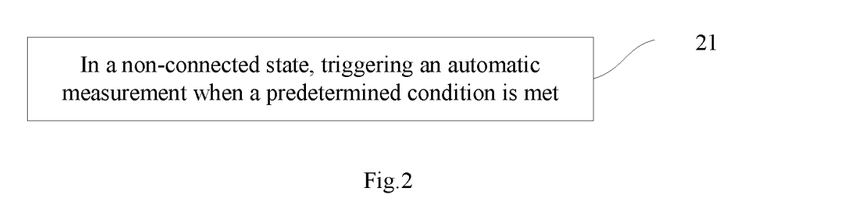
FIG. 2 is a flow chart of a measurement method provided in an embodiment of the present disclosure.

Referring to FIG. 2, FIG. 2 is a flow chart of a measurement method provided in an embodiment of the present disclosure, and the measurement method is performed by a terminal and includes Step 21.

Step 21: in a non-connected state, triggering an automatic measurement when a predetermined condition is met.

The so-called automatic measurement may refer to a measurement performed by the terminal automatically, no matter whether measurement configuration information for the non-connected state has been received in advance from a network side device.

In an embodiment of the present disclosure, it is agreed that the terminal in the non-connected state may trigger the automatic measurement when the predetermined condition has been met, so the terminal may immediately report an indication indicating that there is an available measurement result, or report the available measurement result, to the network side device when entering a connected state. As a result, it is able for the network side device to rapidly configure and activate a CA carrier for the UE in accordance with the measurement result reported by the UE in the non-connected state, thereby to improve the communication efficiency.

In an embodiment of the present disclosure, when a wireless communications system where the UE is located is an eLTE system, the UE may be in two states, i.e., an RRC CONNECTED (CONNECTED) state and an RRC IDLE state, and the non-connected state may be the RRC IDLE state. When the wireless communications system where the UE is located is a 5G system or a subsequently-evolved communications system, apart from the RRC CONNECTED state and the RRC IDLE state, the UE may also be in an RRC INACTIVE (INACTIVE) state, and the RRC IDLE state and the RRC INACTIVE state may be collectively called as non-connected state.

In an embodiment of the present disclosure, the predetermined condition may include at least one of the follows.

1) The terminal has a capability of performing measurement in the non-connected state.

In some embodiments of the present disclosure, capability information about the terminal may be stored in the terminal, and the capability information may be, e.g., information indicating that the terminal has the capability of performing the measurement in the non-connected state, or information indicating that the terminal has a capability of performing the measurement and reporting in the non-connected state.

2) A predetermined uplink service has arrived at the terminal.

In an embodiment of the present disclosure, optionally, the predetermined uplink service may be an enhanced mobile broadband (eMBB) service, or a service where a 5G Quality-of-Service identifier (5G QoS Identifier, 5QI) satisfies a predetermined value. The 5QI may be a QoS feature of the service. Generally, the eMBB service may be a service with a relatively large data volume, so it is necessary to transmit the eMBB service in a carrier aggregation mode.

3) There is no available measurement result for the terminal.

4) A frequency point of a serving cell or neighboring cell of the terminal is included in a frequency point for carrier aggregation supported by the terminal.

5) A measurement validity timer of the terminal has expired or stopped, and the measurement validity timer starts after the terminal has received an RRC connection release message.

6) The terminal fails to initiate an RRC reestablishment process and enters the non-connected state.

In an embodiment of the present disclosure, a radio link failure (RLF) or a handover failure (HOF) occurs for the terminal in the connected state, a reestablishment process may be triggered. When the reestablishment process fails, the terminal may enter the idle state, and the measurement in the connected state may be stopped. At this time, the terminal in the idle state may automatically trigger a measurement configuration for the non-connected state before the RLF or an agreed measurement configuration for the non-connected state, and this is also an appropriate trigger occasion for the terminal to automatically trigger the measurement in the non-connected state.

7) A pre-configuration or an access stratum context stored in the terminal includes the measurement configuration information for the non-connected state.

8) The terminal has received predetermined indication information. The predetermined indication information may be sent by the network side device via first system information, and the predetermined indication information may be indication information indicating that the network side device is capable of receiving a measurement result of the terminal in the non-connected state, or indication information indicating that the network side device supports a carrier aggregation enhancement function, or indication information indicating that the network side device supports a rapid carrier activation and deactivation function.

In an embodiment of the present disclosure, optionally, the first system information may be a system information block type 1 (System Information Block Type 1, SIB1), a system information block type 2 (System Information Block Type 2, SIB2) or remaining minimum system information (Remaining Minimum System Information, RMSI).

9) The terminal has received the measurement configuration information for the non-connected state, and the measurement configuration information for the non-connected state may be transmitted via second system information.

In an embodiment of the present disclosure, optionally, the second system information may be a system information block type 5 (System Information Block Type 5, SIB5) or SIBX, where X is a positive integer not equal to 5. The SIBX may be a system information block type newly introduced for a 5G system or a subsequently-evolved communications system, and it may carry the measurement configuration information for the non-connected state.

The above 1) to 7) are conditions for a terminal side, and 8) and 9 are conditions for a network side.

Figure 3:
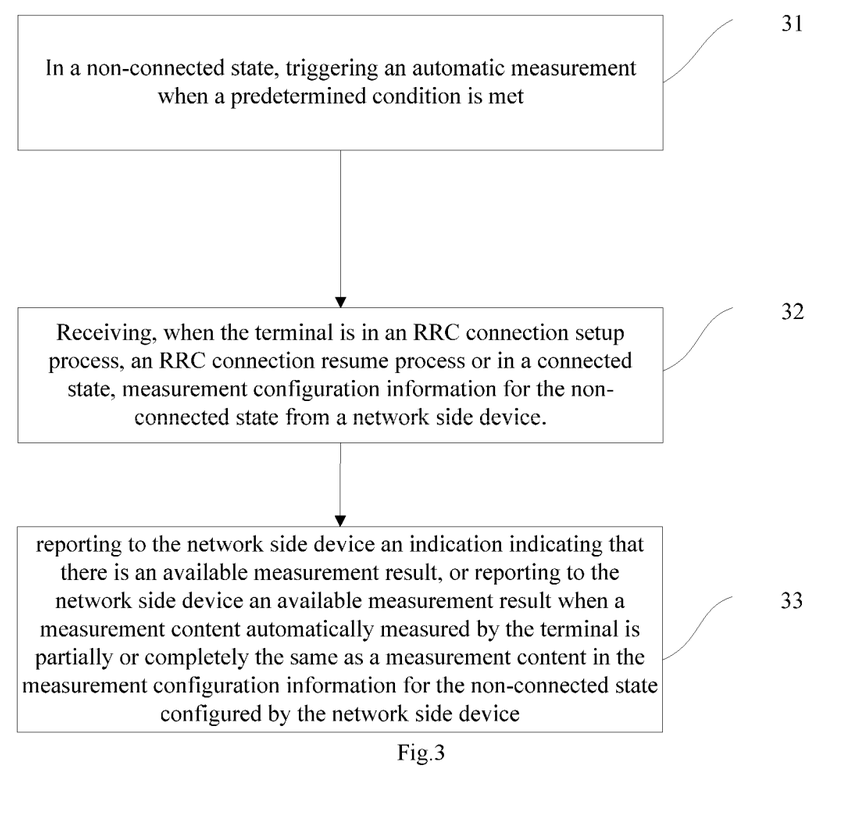
FIG. 3 is a flow chart of a measurement method provided in an embodiment of the present disclosure.

As shown in FIG. 3, FIG. 3 is a flow chart of a measurement method according to another embodiment of the present disclosure, and the measurement method is performed by a terminal and includes the following steps.

Step 31: in a non-connected state, triggering an automatic measurement when a predetermined condition is met.

Step 32: receiving, when the terminal is in an RRC connection setup process, an RRC connection resume process or in a connected state, measurement configuration information for the non-connected state from a network side device.

Optionally, the measurement configuration information for the non-connected state may be sent by the network side device via a fourth message (msg4) or RRC dedicated signaling.

The msg4 may be an RRC connection setup (RRC setup) message, an RRC connection resume (RRC resume) message, an RRC connection reject (RRC reject) message, an RRC connection release (RRC release) message, or RRC dedicated signaling (e.g., RRC reconfiguration).

Step 33: reporting to the network side device an indication indicating that there is an available measurement result, or reporting to the network side device an available measurement result when a measurement content automatically measured by the terminal is partially or completely the same as a measurement content in the measurement configuration information for the non-connected state configured by the network side device.

In an embodiment of the present disclosure, the measurement content may include at least one of the followings.

1) Measurement frequency point
2) Measurement bandwidth or bandwidth part
3) Active measurement area A cell or area measured by the terminal needs to be within the active measurement area. When the cell or area measured by the terminal is not within the active measurement area, a measurement result of the cell or area measured by the terminal may be invalid, and the terminal may not record the measurement result.

The active region may be, e.g., a cell ID list, a physical cell identity (Physical Cell Identity, PCI) list, a subset or universal set of a radio access network notification Area (RAN Notification Area, RNA) ID list, or a subset or universal set of a core network tracking area (Tracking Area, TA) ID list.

4) Target measurement area

The target measurement area may refer to a cell or area to be measured by the terminal.

The target measurement area may be a cell ID List, a PCI list, a subset or universal set of an RNA ID list, or a subset or universal set of a TA ID list.

5) Measurement type

The measurement type may include, e.g., at least one of: reference signal receiving power (Reference Signal Receiving Power, RSRP), reference signal receiving quality (Reference Signal Receiving Quality, RSRQ) or signal to interference plus noise ratio (Signal to Interference plus Noise Ratio, SINR).

6) Measurement report threshold

The measurement report threshold may include, e.g., at least one of: an RSRP threshold, an RSRQ threshold or an SINR threshold.

In an embodiment of the present disclosure, the terminal may report the indication indicating that there is the available measurement result, or report the available measurement result, to the network side device via a fifth message (msg5) or RRC dedicated signaling.

The msg5 may be, e.g., an RRC connection setup complete (RRC setup Complete) message, or an RRC connection resume complete (RRC Resume Complete) message. The RRC dedicated signaling may be, e.g., an RRC reconfiguration complete (RRC Reconfiguration Complete) message.

Figure 4:
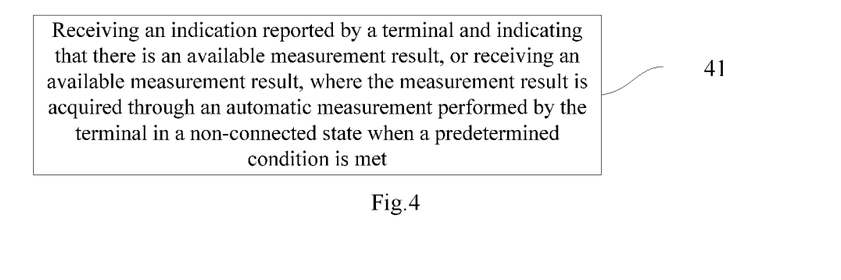
FIG. 4 is a flow chart of a measurement method provided in an embodiment of the present disclosure.

As shown in FIG. 4, an embodiment of the present disclosure further provides a measurement method, and the method is performed by a network side device and incudes Step 41.

Step 41: receiving an indication reported by a terminal and indicating that there is an available measurement result, or receiving an available measurement result, where the measurement result is acquired through an automatic measurement performed by the terminal in a non-connected state when a predetermined condition is met.

In an embodiment of the present disclosure, the network side device may receive the measurement result acquired through the automatic measurement performed by the terminal in the non-connected state when the predetermined condition has been met. As a result, it is able for the network side device to rapidly configure and activate a CA carrier for the terminal in accordance with the measurement result reported by the terminal in the non-connected state, thereby to improve the communication efficiency.

In an embodiment of the present disclosure, optionally, the terminal may report an indication indicating that there is an available measurement result, or report an available measurement result, to the network side device via an msg5 or RRC dedicated signaling.

The msg5 may be, e.g., an RRC connection setup complete (RRC setup Complete) message or an RRC connection resume complete (RRC Resume Complete) message. The RRC dedicated signaling may be, e.g., an RRC reconfiguration complete (RRC Reconfiguration Complete) message.

In an embodiment of the present disclosure, optionally, prior to receiving the indication indicating that there is the available measurement result reported by the terminal or receiving the available measurement result, the measurement method may further include: sending measurement configuration information for the non-connected state to the terminal, and the measurement configuration information for the non-connected state may be sent via at least one of second system information, an msg4 or RRC dedicated signaling.

Optionally, the second system information may be a system information block type 5 or a system information block type X, where X is a positive integer not equal to 5.

In an embodiment of the present disclosure, optionally, prior to receiving the indication indicating that there is the available measurement result reported by the terminal or receiving the available measurement result, the measurement method may further include: sending predetermined indication information to the terminal via first system information. The predetermined indication information may be indication information indicating that a measurement result of the terminal in the non-connected state is capable of being received, or indication information indicating that the network side device supports a carrier aggregation enhancement function, or indication information indicating that the network side device supports a rapid carrier activation and deactivation function.

Optionally, the first system information may be a system information block type 1, a system information block type 2 or remaining minimum system information.

In an embodiment of the present disclosure, the network side device for sending system information (the first system information or the second system information) to the terminal may be the same as, or different from, the network side device for receiving the measurement result of the terminal in the non-connected state. Due to mobility of the terminal, the network side device from which the system information is received by the terminal may be different from the network side device to which the terminal initiates the RRC connection setup process and the RRC connection resume process.

In an embodiment of the present disclosure, optionally, subsequent to receiving the indication reported by the terminal and indicating that there is the available measurement result, the measurement method may further include Step 42 and Step 43.

Step 42: indicating the terminal to report the available measurement result.

Step 43: receiving the available measurement result reported by the terminal.

In an embodiment of the present disclosure, upon the receipt of the available measurement result reported by the terminal, the network side device may configure and activate a carrier aggregation carrier for the terminal in accordance with the available measurement result reported by the terminal, so as to improve the communication efficiency.

Figure 5:
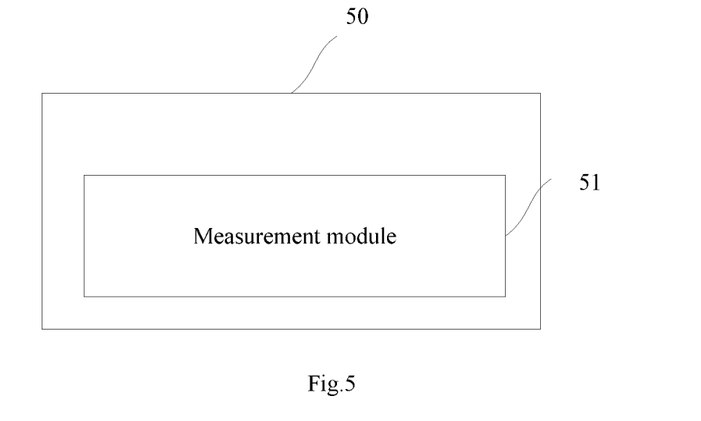
FIG. 5 is a structural schematic view showing a terminal provided in an embodiment of the present disclosure.

As shown in FIG. 5, an embodiment of the present disclosure further provides a terminal 50, and the terminal 50 includes a measurement module 51 configured to trigger an automatic measurement in a non-connected state when a predetermined condition is met.

In an embodiment of the present disclosure, it is agreed that the terminal in the non-connected state may trigger the automatic measurement when the predetermined condition has been met, so the terminal may immediately report an indication indicating that there is an available measurement result, or report the available measurement result, to a network side device when entering a connected state. As a result, it is able for the network side device to rapidly configure and activate a CA carrier for the UE in accordance with the measurement result reported by the UE in the non-connected state, thereby to improve the communication efficiency.

In an embodiment of the present disclosure, optionally, the non-connected state may be an idle state or an inactive state.

In an embodiment of the present disclosure, optionally, the predetermined condition may include at least one of: a condition where the terminal has a capability of performing measurement in the non-connected state; a condition where a predetermined uplink service has arrived at the terminal; a condition where there is no available measurement result for the terminal; a condition where a frequency point of a serving cell or neighboring cell of the terminal is included in a frequency point for carrier aggregation supported by the terminal; a condition where a measurement validity timer of the terminal has expired or stopped and the measurement validity timer starts after the terminal has received an RRC connection release message; a condition where the terminal fails to initiate an RRC reestablishment process and enters the non-connected state; a condition where a pre-configuration or an access stratum context stored in the terminal includes measurement configuration information for the non-connected state; a condition where the terminal has received predetermined indication information, the predetermined indication information being sent by the network side device via first system information, and the predetermined indication information including indication information indicating that the network side device is capable of receiving a measurement result of the terminal in the non-connected state, or indication information indicating that the network side device supports a carrier aggregation enhancement function, or indication information indicating that the network side device supports a rapid carrier activation and deactivation function; or a condition where the terminal has received the measurement configuration information for the non-connected state sent by the network side device via the second system information.

In an embodiment of the present disclosure, optionally, the predetermined uplink service may be an eMBB type service, or a service whose 5QI satisfies a predetermined value.

In an embodiment of the present disclosure, optionally, the first system information may be an SIB1, an SIB2 or RMSI.

In an embodiment of the present disclosure, optionally, the second system information may be an SIB5 or SIBX, where X is a positive integer not equal to 5.

In an embodiment of the present disclosure, optionally, the terminal 40 may further include: a reception module configured to, when the terminal is in an RRC connection setup process or RRC connection resume process or enters a connected state, receive the measurement configuration information for the non-connected state from the network side device.

In an embodiment of the present disclosure, optionally, the measurement configuration information for the non-connected state may be sent by the network side device via an msg4 or RRC dedicated signaling.

In an embodiment of the present disclosure, optionally, the terminal 40 may further include: a reporting module configured to, when a measurement content automatically measured by the terminal is partially or completely the same as a measurement content in the measurement configuration information for the non-connected state configured by the network side device, report an indication indicating that there is an available measurement result, or report an available measurement result, to the network side device.

In an embodiment of the present disclosure, optionally, the measurement content may include at least one of: a measurement frequency point, a measurement bandwidth or bandwidth part, an active measurement area, a target measurement area, a measurement type, or a measurement reporting threshold.

In an embodiment of the present disclosure, optionally, the terminal may report the indication indicating that there is the available measurement result, or report the available measurement result, to the network side device via an msg5 or RRC dedicated signaling.

Figure 6:
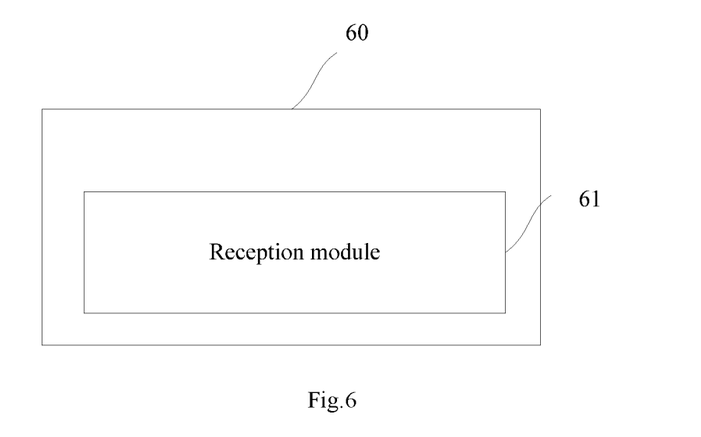
FIG. 6 is a structural schematic view showing a network side device provided in an embodiment of the present disclosure.

Referring to FIG. 6, an embodiment of present disclosure further provides a network side device 60, and the network side device 60 includes: a reception module 61 configured to receive an indication reported by a terminal and indicating that there is an available measurement result, or receive an available measurement result. The measurement result is acquired through an automatic measurement performed by the terminal in a non-connected state when a predetermined condition is met.

In an embodiment of the present disclosure, the network side device may receive the measurement result automatically measured by the terminal in the non-connected state when the predetermined condition has been met. As a result, it is able for the network side device to rapidly configure and activate a CA carrier for the terminal in accordance with the measurement result reported by the terminal in the non-connected state, thereby to improve the communication efficiency.

In an embodiment of the present disclosure, optionally, the terminal may report the indication indicating that there is the available measurement result, or report the available measurement result, to the network side device via an msg5 or RRC dedicated signaling.

The msg5 may be, e.g., an RRC connection setup complete (RRC setup Complete) message, or an RRC connection resume complete (RRC Resume Complete) message. The RRC dedicated signaling may be, e.g., an RRC reconfiguration complete (RRC Reconfiguration Complete) message.

In an embodiment of the present disclosure, optionally, the network side device may further include: a first sending module configured to send the measurement configuration information for the non-connected state to the terminal, and the measurement configuration information for the non-connected state may be sent via at least one of second system information, an msg4 or RRC dedicated signaling.

Optionally, the second system information may be an SIB5 or SIBX, where X is a positive integer not equal to 5.

In an embodiment of the present disclosure, optionally, the network side device may further include: a second transmission module configured to transmit predetermined indication information to the terminal via first system information. The predetermined indication information may be indication information indicating that the network side device is capable of receiving a measurement result of the terminal in the non-connected state, or indication information indicating that the network side device supports a carrier aggregation enhancement function, or indication information indicating that the network side device supports a rapid carrier activation and deactivation function.

Optionally, the first system information may be an SIB1, an SIB2 or RMSI.

In an embodiment of the present disclosure, optionally, the network side device may further include: a prompt module configured to indicate the terminal to report the available measurement result; and a reception module configured to receive the available measurement result reported by the terminal.

In an embodiment of the present disclosure, optionally, the network side device may further include: an activation module configured to configure and activate a carrier aggregation carrier for the terminal in accordance with the available measurement result reported by the terminal.

Figure 7:
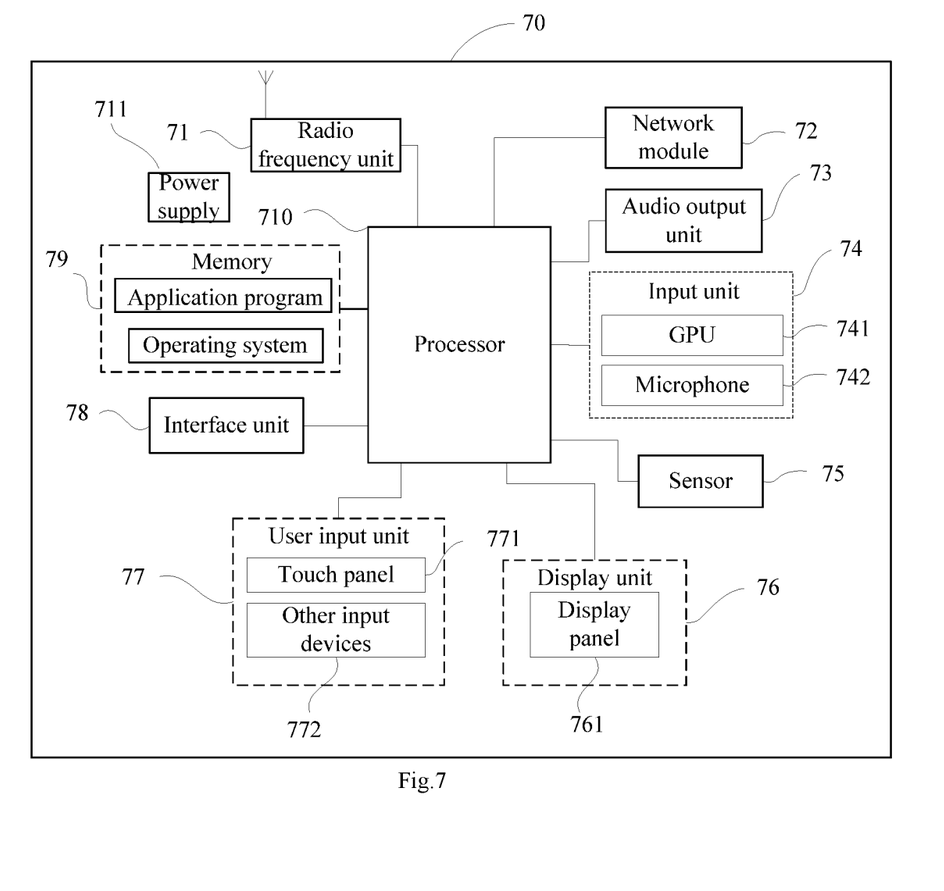
FIG. 7 is a structural schematic view showing a terminal provided in an embodiment of the present disclosure.

Referring to FIG. 7, FIG. 7 is a structural schematic view showing a terminal according to another embodiment of the present disclosure, the terminal 70 includes, but not limited to, a radio frequency unit 71, a network module 72, an audio output unit 73, an input unit 74, a sensor 75, a display unit 76, a user input unit 77, an interface unit 78, a memory 79, a processor 710, and a power supply 711. Those skilled in the art may understand that, the structure of the terminal shown in FIG. 7 shall not be construed as limiting the terminal. The terminal may include more or fewer components, or some components may be combined, or the components may be arranged in different modes. In an embodiment of the present disclosure, the terminal may include, but not limited to, a mobile phone, a tablet computer, a notebook computer, a palmtop computer, a car terminal, a wearable device, a pedometer, and the like.

The processor 710 is configured to trigger an automatic measurement in a non-connected state when a predetermined condition is met.

In an embodiment of the present disclosure, it is agreed that the terminal in the non-connected state may trigger the automatic measurement when the predetermined condition has been met. There is no need to receive measurement configuration information for the non-connected state sent by the network side device, in advance, so the terminal may directly report an indication indicating that there is an available measurement result, or report the available measurement result, to a network side device when initiating an RRC connection setup process or an RRC connection reuse process or when entering a connected state. As a result, it is able for the network side device to rapidly configure and activate a CA carrier for the UE in accordance with the measurement result reported by the UE in the non-connected state, thereby to improve the communication efficiency.

It should be appreciated that, in an embodiment of the present disclosure, the radio frequency unit 71 may be used to transmit and receive signals during the information transmission or phone call. To be specific, the radio frequency unit may, upon the receipt of downlink data from a base station, transmit the downlink data to the processor 710 for subsequent treatment. In addition, the radio frequency unit may transmit uplink data to the base station. Usually, the radio frequency unit 71 may include, but not limited to, an antenna, at least one amplifier, a transceiver, a coupler, a low-noise amplifier and a duplexer, etc. In addition, the radio frequency unit 71 may communicate with a network and the other devices via a wireless communications system.

The network module 72 is configured to enable a user to access the broadband Internet in a wireless manner, e.g., help the user to receive and send an e-mail, browse a web or access a streaming media.

The audio output unit 73 is configured to convert audio data received by the radio frequency unit 71 or the network module 72, or audio data stored in the memory 79, into an audio signal and output the audio signal as a sound. In addition, the audio output unit 73 is further configured to provide an audio output related to a specific function executed by the terminal 70 (e.g., a sound occurring when a calling signal or a message has been received). The audio output unit 73 may include a loudspeaker, a buzzer and a receiver, etc.

The input unit 74 is configured to receive an audio or video signal. The input unit 74 may include a graphics processing unit (Graphics Processing Unit, GPU) 741 and a microphone 742. The graphics processing unit 741 is configured to process image data of a static image or video acquired by an image collection unit (e.g., a camera) in a video capturing mode or an image capturing mode, and a processed image frame may be displayed by the display unit 76. The image frame processed by the graphics processing unit 741 may be stored in the memory 79 (or any other storage medium) or transmitted via the radio frequency unit 71 or network module 72. The microphone 742 is configured to receive a sound, and convert the sound into audio data. In a call mode, the processed audio data may be converted into data in a format capable of being transmitted by the radio frequency unit 71 to a mobile communications base station.

The terminal 70 further includes at least one sensor 75, such as a light sensor, a movement sensor and the other sensors. To be specific, the light sensor may include an ambient light sensor or a proximity sensor. The ambient light sensor is configured to adjust a brightness value of a display panel 761 in accordance with ambient light. The proximity sensor is configured to turn off the display panel 761 and/or a backlight source in a case that the terminal 70 is moved close to an ear. As one of the movement sensors, an accelerometer may detect acceleration in various directions (usually a three-axis accelerometer), and detect a level and a direction of a gravity force when in a static state, to identify a posture of the electronic device (e.g., perform a switching operation between portrait and landscape orientations, play relevant games, and calibrate a posture of a magnetometer), and perform vibration-related functions (e.g., count steps and strikes). The sensor 75 may further include a fingerprint sensor, a pressure sensor, an iris sensor, a molecule sensor, a gyroscope, a barometer, a hygrometer, a thermometer or an infrared sensor, which will not be particularly defined herein.

The display unit 76 is configured to display information inputted by the user or provided to the user. The display unit 76 may include the display panel 761, the display panel 761 may be configured as a form of a liquid crystal display (Liquid Crystal Display, LCD), an organic light-emitting diode (Organic Light-Emitting Diode, OLED) or the like.

The user input unit 77 is configured to receive digital or character information inputted by the user, and generate a key signal input related to user settings and function control of the terminal. To be specific, the user input unit 77 may include a touch panel 771 and other input devices 772. The touch panel 771, also called as touch screen, may collect the user's touch operations thereon or nearby (such as the user's operation on the touch panel 771 or near the touch panel 771 using any suitable object or accessory such as a finger or a stylus). The touch panel 771 may include two parts, namely a touch detection device and a touch controller. The touch detection device detects the touch orientation of the user, and detects a signal generated by the touch operation, and transmits the signal to the touch controller; the touch controller receives touch information from the touch detection device, converts the touch information into a coordinate of a touch point, transmits the coordinate to the processor 710, and may receive and execute a command from the processor 710. In addition, the touch panel 771 may be of a resistive type, a capacitive type, an infrared type or a surface acoustic wave type. In addition to the touch panel 771, the user input unit 77 may further include other input devices 772. Specifically, the other input devices 772 may include, but are not limited to, a physical keyboard, a function button (such as a volume control button, a switch button, etc.), a trackball, a mouse, and a joystick, and details thereof are not described herein again.

Further, the touch panel 771 may cover the display panel 761, in a case that the touch panel 771 detects a touch operation thereon or nearby, the touch operation is transmitted to the processor 710 to determine the type of the touch event, then the processor 710 provides a corresponding visual output on the display panel 761 based on the type of the touch event. Although in FIG. 7, the touch panel 771 and the display panel 761 are implemented as two independent components to implement input and output functions of the terminal, in some embodiments, the touch panel 771 and the display panel 761 may be integrated to implement the input and output functions of the terminal, which are not limited here.

The interface unit 78 is an interface through which an external device is connected to the terminal 70. For example, the external device may include a wired or wireless headset port, an external power supply (or battery charger) port, a wired or wireless data port, a storage card port, a port for connecting a device with an identification module, and an audio input/output (I/O) port, a video I/O port, or a headphone port, etc. The interface unit 78 may be used to receive input (e.g., data information, power, etc.) from the external device and transmit the received input to one or more elements within the terminal 70 or may be used to transmit data between the terminal 70 and the external device.

The memory 79 may be used to store software programs and various data. The memory 79 may mainly include a memory program area and a memory data area, wherein the memory program area may store an operating system, an application program (such as a sound playback function, an image playback function, etc.) required for at least one function, and the like; the memory data area may store data (such as audio data, a phone book, etc.) created based on the use of a mobile phone and the like. In addition, the memory 79 may include a high-speed random access memory, and may further include a non-volatile memory, such as at least one magnetic disk memory device, a flash memory device, or other volatile solid-state memory device.

The processor 710 is a control center of the terminal, and uses various interfaces and lines to connect various parts of the entire terminal. By running or executing software programs and/or modules stored in the memory 79 and calling data stored in the memory 79, various functions of the terminal and processing data are performed, so that the overall monitoring of the terminal is performed. The processor 710 may include one or more processing units; optionally, the processor 710 may integrate an application processor and a modem processor, wherein the application processor mainly processes an operating system, a user interface, and an application program, etc. The modem processor mainly handles wireless communication. It could be understood that the modem processor may not be integrated into the processor 710.

The terminal 70 may further include a power supply 711 (such as a battery) for supplying power to various components. Optionally, the power supply 711 may be logically connected to the processor 710 through a power management system, so as to implement functions such as management of charging, management of discharging, and power consumption management through the power management system.

In addition, the terminal 70 includes some functional modules that are not shown, and details are not described herein again.

Figure 8:
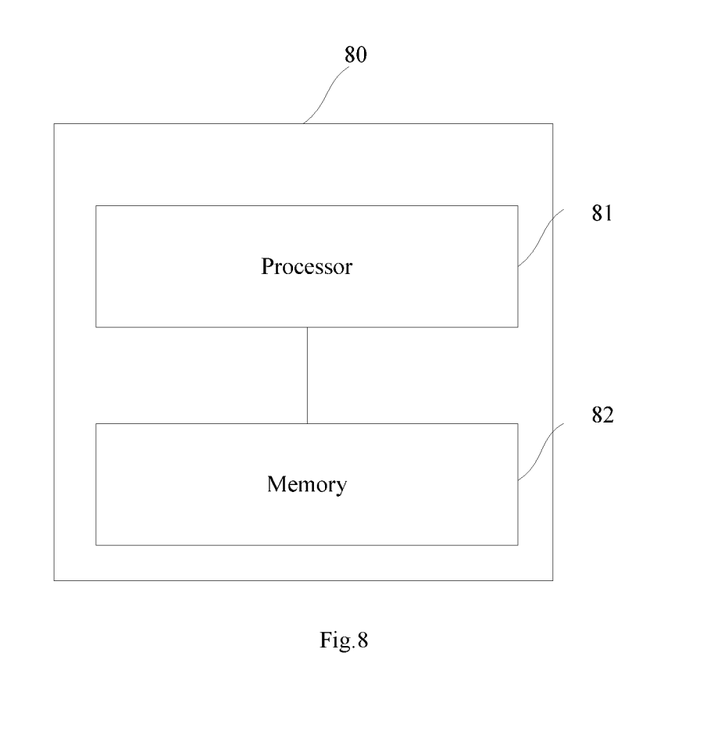
FIG. 8 is a structural schematic view showing a terminal provided in an embodiment of the present disclosure.

Referring to FIG. 8, FIG. 8 is a structural schematic view showing a terminal according to another embodiment of the present disclosure, the terminal 80 further includes a processor 81 and a memory 82. In an embodiment of the present disclosure, the terminal 80 may further include: a computer program stored in the memory 82 and executed by the processor 81. The computer program is executed by the processor 81 so as to trigger automatic measurement in a non-connected state when a predetermined condition is met.

The processor 81 is responsible for managing the bus architecture and general processing, and the memory 82 may store data used by the processor 81 when performing operations.

Optionally, the non-connected state may be an idle state or an inactive state.

Optionally, the predetermined condition may include at least one of: a condition where the terminal has a capability of performing measurement in the non-connected state; a condition where a predetermined uplink service has arrived at the terminal; a condition where there is no available measurement result for the terminal; a condition where a frequency point of a serving cell or neighboring cell of the terminal is included in a frequency point for carrier aggregation supported by the terminal; a condition where a measurement validity timer of the terminal has expired or stopped and measurement validity timer starts after the terminal has received an RRC connection release message; a condition where the terminal fails to initiate an RRC reestablishment process and enters the non-connected state; a condition where a pre-configuration or an access stratum context stored in the terminal includes the measurement configuration information for the non-connected state; a condition where the terminal has received predetermined indication information, the predetermined indication information being transmitted by the network side device via first system information, and the predetermined indication information including indication information indicating that the network side device is capable of receiving a measurement result of the terminal in the non-connected state, or indication information indicating that the network side device supports a carrier aggregation enhancement function, or indication information indicating that the network side device supports a rapid carrier activation and deactivation function; or a condition where the terminal has received the measurement configuration information for the non-connected state transmitted by the network side device via the second system information.

Optionally, the predetermined uplink service may be an eMBB type service, or an eMBB type service whose 5QI exceeds a predetermined value.

Optionally, the first system information may be an SIB2 or RMSI.

Optionally, the second system information may be an SIB5 or SIBX, where X is a positive integer not equal to 5.

Optionally, the computer program is executed by the processor 81, so as to, after the automatic measurement has been triggered and when the terminal is in an RRC connection setup process or RRC connection resume process or enters a connected state, receive the measurement configuration information for the non-connected state from the network side device.

Optionally, the measurement configuration information for the non-connected state may be sent by the network side device via an msg4 or RRC dedicated signaling.

Optionally, the computer program is executed by the processor 81, so as to, after the measurement configuration information for the non-connected state has been received from the network side device and when a measurement content automatically measured by the terminal is partially or completely the same as a measurement content in the measurement configuration information for the non-connected state configured by the network side device, report an indication indicating that there is an available measurement result, or report the available measurement result, to the network side device.

Optionally, the measurement content may include at least one of: a measurement frequency point, a measurement bandwidth or bandwidth part, an active measurement area, a target measurement area, a measurement type, or a measurement reporting threshold.

Optionally, the terminal may report the indication indicating that there is the available measurement result, or report the available measurement result, to the network side device via an msg5 or RRC dedicated signaling.

Figure 9:
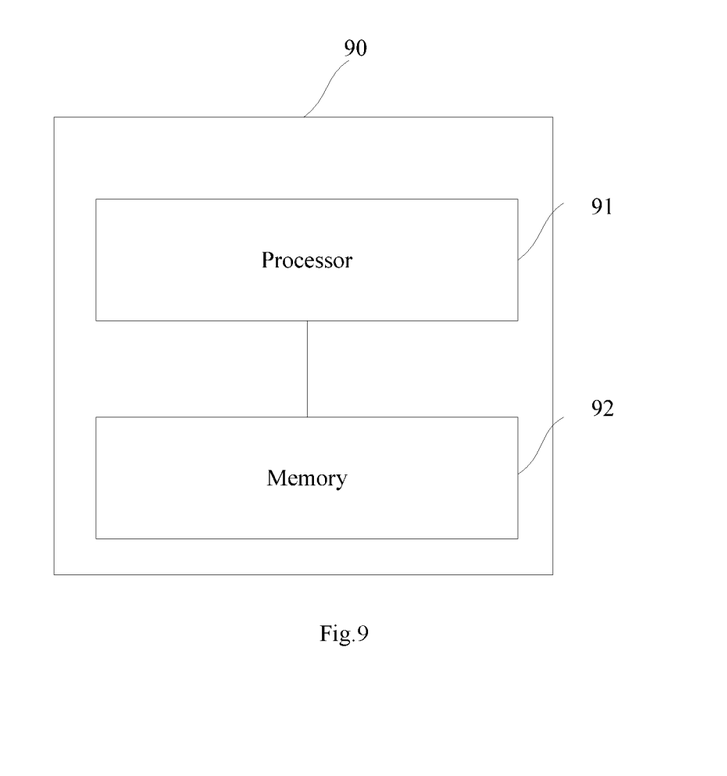
FIG. 9 is a structural schematic view showing a network side device provided in an embodiment of the present disclosure.

Referring to FIG. 9, FIG. 8 is a structural schematic view showing a network side device according to another embodiment of the present disclosure, and the network side device 90 includes a processor 91 and a memory 92. In an embodiment of the present disclosure, the network side device 90 may further include a computer program stored in the memory 92 and executed by the processor 91. The computer program is executed by the processor 91, so as to receive an indication reported by a terminal and indicating that there is an available measurement result, or receive the available measurement result. The measurement result is acquired through an automatic measurement performed by the terminal in a non-connected state when a predetermined condition is met.

The processor 91 may take charge of managing bus architecture as well as general processings. The memory 92 may store therein data for the operation of the processor 91.

Optionally, the terminal may report the indication indicating that there is the available measurement result, or report the available measurement result, to the network side device through an msg5 or RRC dedicated signaling.

Optionally, the computer program is executed by the processor 91, so as to, before receiving the indication reported by the terminal and indicating that there is the available measurement result or receiving the available measurement result, send the measurement configuration information for the non-connected state to the terminal, and the measurement configuration information for the non-connected state may be sent via at least one of second system information, an msg4 or RRC dedicated signaling.

Optionally, the second system information may be an SIB5 or SIBX, where X is a positive integer not equal to 5.

Optionally, the computer program is executed by the processor 91, so as to, before receiving the indication reported by the terminal and indicating that there is the available measurement result or receiving the available measurement result, send predetermined indication information to the terminal via first system information. The predetermined indication information may be indication information indicating that the network side device is capable of receiving a measurement result of the terminal in the non-connected state, or indication information indicating that the network side device supports a carrier aggregation enhancement function, or indication information indicating that the network side device supports a rapid carrier activation and deactivation function.

Optionally, the first system information may be an SIB1, an SIB2 or RMSI.

Optionally, the computer program is executed by the processor 91 so as to, after receiving the indication reported by the terminal and indicating that there is the available measurement result, indicate the terminal to report the available measurement result, and receive the available measurement result reported by the terminal.

Optionally, the computer program is executed by the processor 91, so as to configure and activate a carrier aggregation carrier for the terminal in accordance with the available measurement result reported by the terminal.

An embodiment of the present disclosure further provides a computer-readable storage medium storing therein a computer program. The computer program is executed by a processor, so as to implement the above-mentioned measurement methods with a same technical effect, which will not be particularly defined herein. The computer-readable storage medium may be, e.g., a read-only memory (Read-Only Memory, ROM), a random access memory (Random Access Memory, RAM), a magnetic disk or an optical disk, etc.

It should be noted that, in this article, the terms "including" or "having" or any other variations thereof are intended to encompass a non-exclusive inclusion, such that a process, method, article, or device that includes a plurality of elements includes not only those elements but also other elements not explicitly listed, or elements that are inherent to such a process, method, article, or device. An element after a phrase "comprising a . . . " does not exclude presence of additional identical elements in the process, method, article, or device that comprises the element, without further limitation.

Through description of the foregoing embodiments, it is clear to those skilled in the art that the foregoing method embodiments may be implemented by software plus a necessary general hardware platform, and certainly may also be implemented by hardware, but in many cases, the former is a better implementation. Based upon such understanding, the technical solutions of the present disclosure essentially or a part thereof contributing to the prior art may be embodied in the form of a computer software product which may be stored in a storage medium (e.g., a ROM/RAM, a magnetic disk or an optical disk) and which includes several instructions to cause a terminal (which may be a mobile phone, a computer, a server, an air-conditioner or a network device, etc.) to perform the methods described in the various embodiment of the present disclosure.

The embodiments of the present disclosure are described above with reference to the accompanying drawings, but the present disclosure is not limited to the above-mentioned specific embodiments, and the above-mentioned specific embodiments are only illustrative and not restrictive. A person of ordinary skill in the art with hints of the present disclosure may also make many forms that fall within the protection scope of the present disclosure without departing from the spirit and the protection scope of the claims of the present disclosure.

What is claimed is:

1. A measurement method, performed by a terminal, comprising:
   in a non-connected state, triggering an automatic measurement when a predetermined condition is met;
   wherein the predetermined condition comprises a condition where a predetermined uplink service has arrived at the terminal;
   wherein the predetermined uplink service is an enhanced Mobile Broadband (eMBB) type service whose $5^{th}$ generation (5G) Quality-of-Service Identifier (5QI) exceeds a predetermined value.

2. The measurement method according to claim 1, wherein the non-connected state is an idle state or an inactive state.

3. The measurement method according to claim 1, wherein the predetermined condition further comprises at least one of:
   a condition where the terminal has a capability of performing measurement in the non-connected state;
   a condition where there is no available measurement result for the terminal;
   a condition where a frequency point of a serving cell or neighboring cell of the terminal is comprised in a frequency point for carrier aggregation supported by the terminal;
   a condition where a measurement validity timer of the terminal has expired or stopped and the measurement validity timer starts after the terminal has received a Radio Resource Control (RRC) connection release message;
   a condition where the terminal fails to initiate an RRC reestablishment process and enters the non-connected state;

a condition where a pre-configuration or an Access Stratum (AS) context stored in the terminal comprises measurement configuration information for the non-connected state;

a condition where the terminal has received predetermined indication information, the predetermined indication information being sent by the network side device via first system information, and the predetermined indication information comprising indication information indicating that the network side device is capable of receiving a measurement result of the terminal in the non-connected state, or indication information indicating that the network side device supports a carrier aggregation enhancement function, or indication information indicating that the network side device supports a rapid carrier activation and deactivation function; or a condition where the terminal has received measurement configuration information for the non-connected state sent by the network side device via the second system information.

4. The measurement method according to claim 3, wherein the first system information is a system information block type 1, a system information block type 2 or remaining minimum system information.

5. The measurement method according to claim 3, wherein the second system information is a system information block type 5 or a system information block type X, where X is a positive integer not equal to 5.

6. The measurement method according to claim 1, wherein subsequent to triggering the automatic measurement, the measurement method further comprises:

receiving, when the terminal is in an RRC connection setup process or RRC connection resume process or enters a connected state, measurement configuration information for the non-connected state from the network side device.

7. The measurement method according to claim 6, wherein the measurement configuration information for the non-connected state is sent by the network side device via a fourth message (msg4) or RRC dedicated signaling.

8. The measurement method according to claim 7, wherein the terminal reports the indication indicating that there is an available measurement result, or report an available measurement result, to the network side device through a fifth message (msg5) or RRC dedicated signaling.

9. The measurement method according to claim 6, wherein subsequent to receiving the measurement configuration information for the non-connected state from the network side device, the measurement method further comprises:

reporting an indication indicating that there is an available measurement result, or reporting an available measurement result, to the network side device when a measurement content automatically measured by the terminal is partially or completely the same as a measurement content in the measurement configuration information for the non-connected state configured by the network side device.

10. The measurement method according to claim 9, wherein the measurement content comprise at least one of:
a measurement frequency point;
a measurement bandwidth or bandwidth part;
an active measurement area;
a target measurement area;
a measurement type;
a measurement reporting threshold.

11. A measurement method, performed by a network side device, comprising:

receiving an indication reported by a terminal and indicating that there is an available measurement result, or receiving an available measurement result, wherein the measurement result is acquired through an automatic measurement performed by the terminal in a non-connected state when a predetermined condition is met;

wherein the predetermined condition comprises a condition where a predetermined uplink service has arrived at the terminal;

wherein the predetermined uplink service is an enhanced Mobile Broadband (eMBB) type service whose $5^{th}$ generation (5G) Quality-of-Service Identifier (5QI) exceeds a predetermined value.

12. The measurement method according to claim 11, wherein prior to receiving the indication reported by the terminal and indicating that there is the available measurement result or receiving the available measurement result, the measurement method further comprises:

sending measurement configuration information for the non-connected state to the terminal, wherein the measurement configuration information for the non-connected state is sent via at least one of second system information, an msg4 or Radio Resource Control (RRC) dedicated signaling.

13. The measurement method according to claim 12, wherein the second system information is a system information block type 5 or a system information block type X, where X is a positive integer not equal to 5.

14. The measurement method according to claim 11, wherein prior to receiving the indication reported by the terminal and indicating that there is the available measurement result or receiving the available measurement result, the measurement method further comprises:

sending predetermined indication information to the terminal via first system information, wherein the predetermined indication information comprises indication information indicating that the network side device is capable of receiving a measurement result of the terminal in the non-connected state, or indication information indicating that the network side device supports a carrier aggregation enhancement function, or indication information indicating that the network side device supports a rapid carrier activation and deactivation function.

15. The measurement method according to claim 14, wherein the first system information is a system information block type 1, a system information block type 2 or remaining minimum system information.

16. The measurement method according to claim 11, wherein the terminal reports the indication indicating that there is the available measurement result, or reports the available measurement result, to the network side device via a fifth message (msg5) or RRC dedicated signaling.

17. A network side device, comprising a processor, a memory, and a computer program stored in the memory and executed by the processor, wherein the computer program is executed by the processor, the step of the measurement method according to claim 11 is implemented.

18. A terminal, comprising a processor, a memory, and a computer program stored in the memory and executed by the processor, wherein the computer program is executed by the processor, the processor implements the following process:

in a non-connected state, triggering an automatic measurement when a predetermined condition is met;

wherein the predetermined condition comprises a condition where a predetermined uplink service has arrived at the terminal;

wherein the predetermined uplink service is an enhanced Mobile Broadband (eMBB) type service whose $5^{th}$ generation (5G) Quality-of-Service Identifier (5QI) exceeds satisfies a predetermined value.

19. The terminal according to claim 18, wherein the predetermined condition further comprises at least one of:

a condition where the terminal has a capability of performing measurement in the non-connected state;

a condition where there is no available measurement result for the terminal;

a condition where a frequency point of a serving cell or neighboring cell of the terminal is comprised in a frequency point for carrier aggregation supported by the terminal;

a condition where a measurement validity timer of the terminal has expired or stopped and the measurement validity timer starts after the terminal has received a Radio Resource Control (RRC) connection release message;

a condition where the terminal fails to initiate an RRC reestablishment process and enters the non-connected state;

a condition where a pre-configuration or an Access Stratum (AS) context stored in the terminal comprises measurement configuration information for the non-connected state;

a condition where the terminal has received predetermined indication information, the predetermined indication information being sent by the network side device via first system information, and the predetermined indication information comprising indication information indicating that the network side device is capable of receiving a measurement result of the terminal in the non-connected state, or indication information indicating that the network side device supports a carrier aggregation enhancement function, or indication information indicating that the network side device supports a rapid carrier activation and deactivation function; or a condition where the terminal has received measurement configuration information for the non-connected state sent by the network side device via the second system information.

20. The terminal according to claim 18, wherein subsequent to triggering the automatic measurement, the processor implements the following process:

receiving, when the terminal is in an RRC connection setup process or RRC connection resume process or enters a connected state, measurement configuration information for the non-connected state from the network side device.

* * * * *